US008990239B2

(12) United States Patent
Butler

(10) Patent No.: US 8,990,239 B2
(45) Date of Patent: Mar. 24, 2015

(54) SYSTEMS AND METHODS FOR PHOTOGRAPH MAPPING

(76) Inventor: Lance Butler, Seattle, WA (US)

( * ) Notice: Subject to any disclaimer, the term of this patent is extended or adjusted under 35 U.S.C. 154(b) by 0 days.

(21) Appl. No.: 13/196,044

(22) Filed: Aug. 2, 2011

(65) Prior Publication Data

US 2012/0243804 A1 Sep. 27, 2012

Related U.S. Application Data

(63) Continuation of application No. 12/438,360, filed as application No. PCT/US2007/076718 on Aug. 24, 2007, now abandoned.

(60) Provisional application No. 60/840,134, filed on Aug. 24, 2006.

(51) Int. Cl.
*G06F 17/30* (2006.01)

(52) U.S. Cl.
CPC ................................ *G06F 17/30265* (2013.01)
USPC ............ 707/763; 707/798; 707/803; 707/808

(58) Field of Classification Search
USPC .......................... 707/616, 763, 798, 808, 803
See application file for complete search history.

(56) References Cited

U.S. PATENT DOCUMENTS 6,246,412 B1 * 6/2001 Shum et al. .................. 345/419
6,956,573 B1 * 10/2005 Bergen et al. ................ 345/473
7,187,377 B1 * 3/2007 Pella et al. .................... 345/419
2001/0010546 A1 * 8/2001 Chen ............................ 348/218
2002/0029226 A1 3/2002 Li et al.
2002/0044690 A1 4/2002 Burgess
2002/0047895 A1 * 4/2002 Bernardo et al. ............... 348/48
2002/0156688 A1 * 10/2002 Horn et al. ...................... 705/26
2003/0028118 A1 * 2/2003 Dupree et al. ................ 600/509
2005/0073443 A1 4/2005 Sheha et al.
2005/0075167 A1 * 4/2005 Beaulieu et al. ................ 463/32
2005/0195154 A1 * 9/2005 Robbins et al. ............... 345/156
2005/0197763 A1 * 9/2005 Robbins et al. ............... 701/200
2005/0207672 A1 * 9/2005 Bernardo et al. ............. 382/284
2005/0278371 A1 12/2005 Funk et al.
2006/0136309 A1 * 6/2006 Horn et al. ...................... 705/26
2006/0155684 A1 * 7/2006 Liu et al. ........................... 707/3
2006/0195475 A1 8/2006 Logan et al.
2007/0070233 A1 3/2007 Patterson
2007/0186178 A1 * 8/2007 Schiller ......................... 715/769
2009/0204920 A1 * 8/2009 Beverley et al. .............. 715/768

* cited by examiner

*Primary Examiner* — Hanh Thai

(74) *Attorney, Agent, or Firm* — Foster Pepper PLLC; Richard T. Black

(57) ABSTRACT

Systems and methods for photograph mapping are disclosed herein. In one embodiment a first digital image and at least one user-generated datum is received from at least one user. The first image is geographically organized according to the at least one datum. The first image is associated with at least one location and at least one direction. The first image is provided from a first person perspective to a user in response to a request.

2 Claims, 10 Drawing Sheets

190 192 198 1108 1104 1102 1100 194 196 1106

1110
Tweak | Set As Start | Save Locale | Unpublish | Help
Map | Satellite | Hybrid
*Fig. 8A*
1110
Tweak | Set As Start | Save Locale | Unpublish | Help
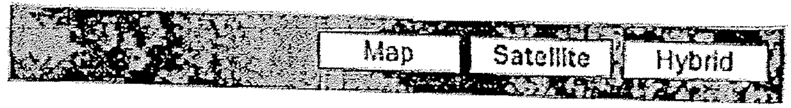
*Fig. 8B*
1110
Tweak | Set As Start | Save Locale | Unpublish | Help
Map | Satellite | Hybrid
*Fig. 8C*
1110
Tweak | Set As Start | Save Locale | Unpublish | Help
Map | Satellite | Hybrid
*Fig. 8D*
1110
Tweak | Set As Start | Save Locale | Unpublish | Help
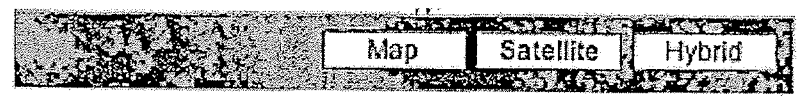
*Fig. 8E*

SYSTEMS AND METHODS FOR PHOTOGRAPH MAPPING

PRIORITY CLAIM

This application is a continuation of U.S. Utility application Ser. No. 12/438,360 filed Feb. 20, 2009 now abandoned, a National Stage entry under 35 USC 371 of United States Patent Cooperation Treaty Application Serial No. PCT/US07/76718 filed Aug. 24, 2007 which claims the benefit of U.S. Provisional Application Ser. No. 60/840,134 filed on Aug. 24, 2006 and U.S. Utility application Ser. No. 11/844,203 filed Aug. 23, 2007, all of which are herein incorporated by reference in their entirety.

BACKGROUND OF THE INVENTION

Consumers have an enormous and increasing need for visual detail and information on real-world places. This is easily evidenced by the aggressive moves into mapping and local search by Google, Yahoo, Microsoft, Amazon and others.

SUMMARY OF THE INVENTION

Systems and methods for photograph mapping are disclosed herein. In one embodiment a first digital image and at least one user-generated datum is received from at least one user. The first image is geographically organized according to the at least one datum. The first image is associated with at least one location and at least one direction. The first image is provided from a first person perspective to a user in response to a request.

BRIEF DESCRIPTION OF THE DRAWINGS

The preferred and alternative embodiments of the present invention are described in detail below with reference to the following drawings.

FIGS. 8A-E show a Save Locale button in multiple embodiments; and

DETAILED DESCRIPTION OF THE PREFERRED EMBODIMENT

Figure 1:
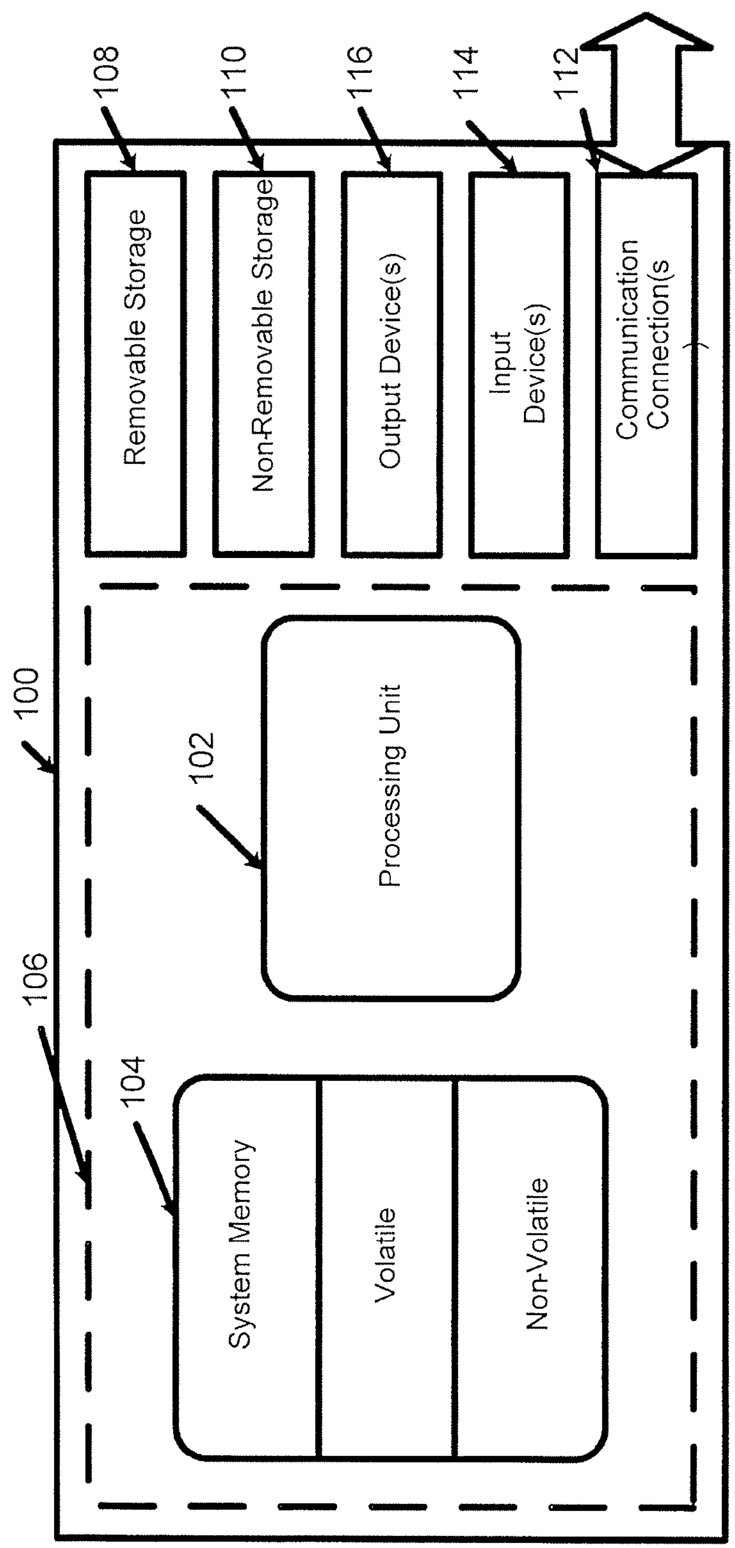
FIG. 1 illustrates an example of a computing system environment 100 on which an embodiment of the invention may be implemented.

An embodiment of the current invention provides tools that allow anyone in the world to take photos, upload them to a database, and/or put them together to create their own navigable locales. It is just as easy to include indoor data as outdoor data. Users can seamlessly navigate between outdoor and indoor locations.

An embodiment of the current invention provides tools to make it relatively quick and easy to build navigable locales. Because one embodiment of the tools works within a standard browser, the tools can be made available to the general public anywhere in the world. Other embodiments can be built as standalone or downloadable applications to provide other functionality.

An embodiment of the invention works with still images, and any device capable of capturing digital images and transferring the images to a computer-readable memory is compatible with the invention. Various embodiments require no special hardware or software, no plug-ins or downloaded applications; a standard web browser is all that is needed. Embodiments give users the ability to create and view geo-located, navigationally linked images of real-world locations, and allows anyone to blanket an area with photos in an organized way so others can use their web browser to visually "walk around" that area with a first-person perspective. Any type of place, anywhere in the world: businesses, homes, parks, travel destinations, etc. Embodiments are designed to allow tight physical density for this type of visual navigation, but also allow for arbitrary physical density, where users are free to pack spots as tight or loose as they wish.

Innovations of the current invention include an easy-to-use system for managing large amounts of photographic images and/or linking them together, as well as an easy way to navigate these photographs.

Users of the current invention can interconnect locales made by many people to completely "blanket" a region with images, and eventually the entire world. By allowing users to interlink their locales, embodiments enable users to create their own virtual communities oriented around very specific places and/or activities or interests. Users don't even need to live in or near these places to contribute.

Users can create "tours" (or "trails" or "threads") highlighting spots or views of interest through any existing locales, including locales of other users. The tours are like guided tours that users can create for others to follow. When a user follows a particular tour, the user is guided through an ordered set of moves, turns and/or zooms to see whatever the creator of the tour wants to highlight and/or talk about. The tour creator can make a set of comments that take priority over the standard comments, showing prominently.

Locales are geo-located, and can be tagged, blogged and rated, and are fully searchable. Users can read and write comments or questions for any locale or image in the world in place-logs (or "plogs"). Users can search the various data by geographic location, by tags, by comments or by other criteria.

Embodiments provide tools that allow users anywhere in the world to create and organize large amounts of image data quickly and efficiently. Embodiments can include integrated support for tags, comments, locale interlinks, zooms, user requests, and other data associated with locales and/or images. Embodiments can allow many types of searches, including but not limited to geographic searches based on location, tag searches based on user-entered tags and place or landmark name searches. There are general map browsing tools provided by the embedded map engine, i.e. panning, zooming and changing map types.

With embodiments of the current invention, users can view specific areas or items of interest in high visual detail without requiring all the imagery for the spot to be of high resolution, and with no limits on the detail magnification. This allows zooming in on a feature of interest of arbitrarily high resolution, so extreme details can be provided, and allows far less data to be transferred to the client to show a particular view.

Aspects of the invention provide users the ability to visually navigate remote places in a new, novel and natural way, using nothing more than still photos and a basic web browser.

Aspects of the invention provide tools that allow anyone to create visually navigable locales from simple photos. The process is not limited by proprietary tools or knowledge, and does not need special equipment. Nothing is required beyond an inexpensive digital camera and a standard web browser.

In aspects of the invention you have the freedom to move around similarly to how you move in real life, i.e. you walk forward to other spots within your forward vision, and turn left/right/up/down as if you were there. Navigational linkage between spots is explicit, not merely implied by location and direction. This creates logically cohesive data.

Spots can be created wherever anyone can take pictures, i.e. indoor/outdoor, urban settings or in the middle of a forest.

Aspects of the invention allow for navigationally interlinked locales, making it possible for many individuals to collectively blanket entire cities, and indeed the world. Either through planned collaboration, or after the fact. Interlinked locales make the whole more valuable than the sum of the parts.

Aspects of the invention provide virtual reality (VR)-like navigation and views, but unlike traditional VR allows for virtually unlimited detail of objects or points of interest without significantly increasing data or bandwidth requirements.

Aspects of the invention include geo-location of photos by simply clicking on a high-resolution map in a browser, using no plug-ins or extra software.

Aspects of the invention provide a new and novel visual display of the "level of dirtiness" of documents or local data.

With aspects of the invention, anyone can document a particular location over time. Different times of day, times of year, or changes over an extended period of time.

Aspects of the invention provide for unique types of "embedded ads" directly within the first-person real-world views.

Aspects of the invention have a proprietary provisional data scheme to greatly reduce the amount of "bad data" that gets into the system.

A method of the invention includes receiving user-generated digital images and user-generated data about the images from users; organizing and linking the images geographically according to the user-generated data, and displaying the images in response to a user request.

An embodiment includes but is not limited to five types of objects: views, spots, locales, zooms and trails.

A view as described herein is a single digital image, which can be a photographic image. Each view is associated with a spot and can have a defined orientation associated with the view, including a lateral (compass) direction denoting a direction a camera was facing when the image was captured, as well as a vertical angle relative to a horizon of the location. Views can include time references including time of day, date, and season.

A zoom has described herein can be a close-up image of an area or point of interest within a view, but it need not be simply a higher resolution zoomed version of the original view. This gives users creative flexibility to make interesting and creative zoomed images. Views and zooms can also include tags, which are words or short phrases. In addition to latitude and longitude, views can also include elevation. A view's elevation can be specified by "floor" (as in a building), or in feet above sea level.

A spot has described herein has one or more views, taken from a single geographic location, facing in different lateral and/or vertical directions. Each spot has a precise geographic location, which can be indicated by latitude and longitude, elevation, GPS coordinates, or other means. In one embodiment, spots include 8 lateral views, which can align, for example, with the 8 major compass directions. In other embodiments, a spot can have any number of views associated with the spot, facing in arbitrary directions. Horizontally oriented lateral views give the user the ability to rotate the view left and right, conversely views taken at other angles relative to horizontal allow the user to see up or down. Furthermore, views taken from the same spot at different times can also be included, allowing users to watch how a location changes over time.

A locale, as described herein is a coverage area of one or more spots. Spots can be interlinked within a locale, so users can navigate between spots. Locales can be interlinked when their borders become sufficiently close or overlap, allowing users to navigate among locales without leaving their first-person frame of reference. Interlinked locales are locales with linkage from one or more existing spots in one locale to one or more existing spots in another locale.

A trail as described herein is defined as paths that lead a user through a specific sequence of views and/or zooms of one or more spots in one or more locales. Users can create a trail through their own locales or other users' locales, or a combination of both.

FIG. 1 illustrates an example of a computing system environment 100 on which an embodiment of the invention may be implemented. The computing system environment 100, as illustrated, is an example of a suitable computing environment, however it is appreciated that other environments, systems, and devices may be used to implement various embodiments of the invention as described in more detail below.

Embodiments of the invention are operational with numerous other general-purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, mobile telephones, portable data assistants, network PCs, minicomputers, mainframe computers, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices.

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also contain a communications connection 112 that allows the device to communicate with other devices. The Communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

Figure 2:
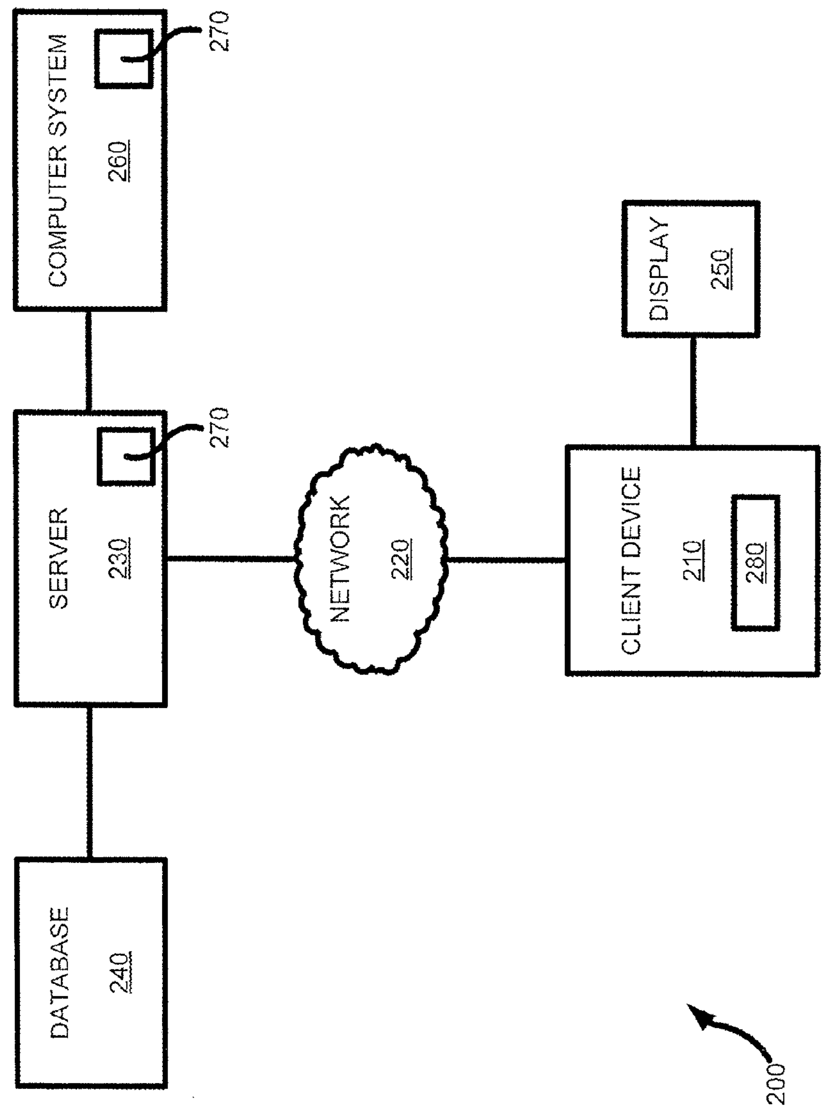
FIG. 2 is a functional block diagram of an exemplary operating environment in which an embodiment of the invention can be implemented.

Referring now to FIG. 2, an embodiment of the present invention takes the form of an exemplary computer network system 200. The system 200 includes an electronic client device 210, such as a personal computer or workstation or portable data assistant or mobile telephone, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled to a computer screen or display 250. The client device 210 may be used for various purposes such as network- and local-computing processes.

The client device 210 is linked via the network 220 to server 230 so that computer programs, such as, for example, a browser, running on the client device 210 can cooperate in two-way communication with server 230. The server 230 may be coupled to database 240 to retrieve information therefrom and to store information thereto. Database 240 may include a plurality of different tables (not shown) that can be used by the server 230 to enable performance of various aspects of embodiments of the invention. Additionally, the server 230 may be coupled to the computer system 260 in a manner allowing the server to delegate certain processing functions to the computer system.

Still referring to FIG. 2, and in operation according to an embodiment of the invention, a user (not shown) of the client device 210 desiring to electronically organize and map a series of photographs.

Still referring to FIG. 2, and in operation according to an embodiment of the invention, a user (not shown) of the client device 210 desiring to electronically map photographs uses a browser application running on the client device to access web content, which may, but need not, be served by the server 230. Specifically, by employing an appropriate uniform resource locator (URL) in a known manner, the user may download from the server 230 and install on the client device 210 a user interface module 280 comprising computer-executable instructions as described more fully hereinafter. Alternatively, the user may receive the module 280 on a tangible computer-readable medium (not shown), such as, for example, a CD-ROM, and subsequently install the module on the client device 210 from the medium.

Figure 3:
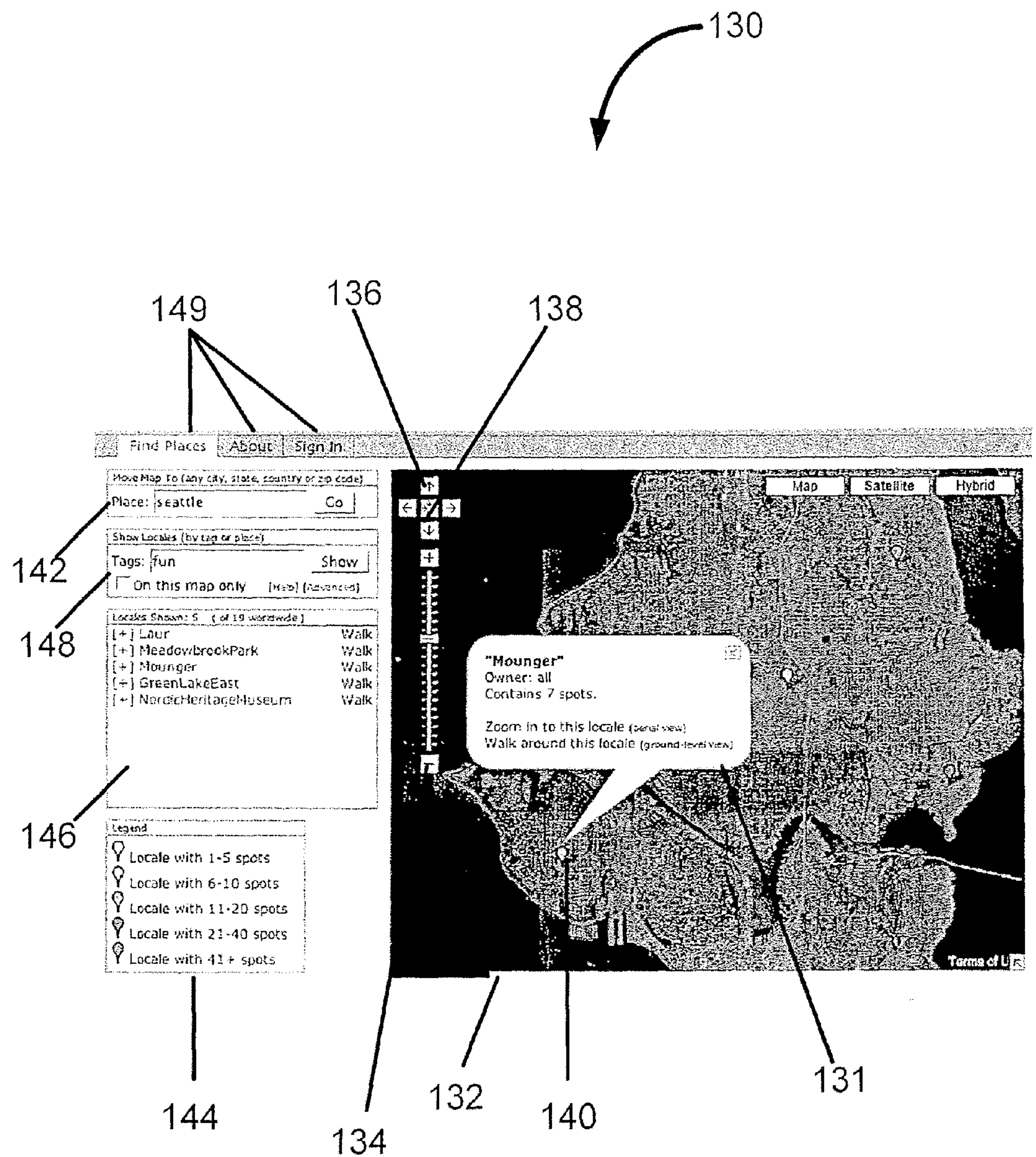
FIG. 3 shows a "Find Places" GUI finding locations and views.

Upon execution of the module 280 by the client device 210, and referring to FIG. 3, a user interface 130 may be displayed on the display device 250.

Embodiments of the invention include various graphical user interfaces (GUIs) for allowing a user to interact with the embodiments. A "Find Places" GUI 130 for finding locations and views is shown in FIG. 3. The GUI 130 includes a map 132 with a zoom bar 134 and navigation buttons 136 for changing an area displayed by the map 132, including a "Center" button 138. The map 132 includes markers 140 which can denote locations of views, spots, and locales. Users can jump directly to any city, state, country or zip code by inputting the information in a "Place" field 42, or browse at random among markers 140 on the map 132, or search for or filter based on, tags with a "Tags" field 148. A "Current Locale" window 131 displays a name of, owner of, and number of spots contained in, the current locale. The window 131 can also display clickable options such as zooming in to or walking around the current locale. A legend 144 can be included, showing the spot density of each locale, or any other information of interest. A clickable list 146 of locales can be included, allowing a user to select a locale from the list 46 for display on the map 132. Tabs 149 can be included to allow users to quickly navigate between GUI functional areas.

Figure 4:
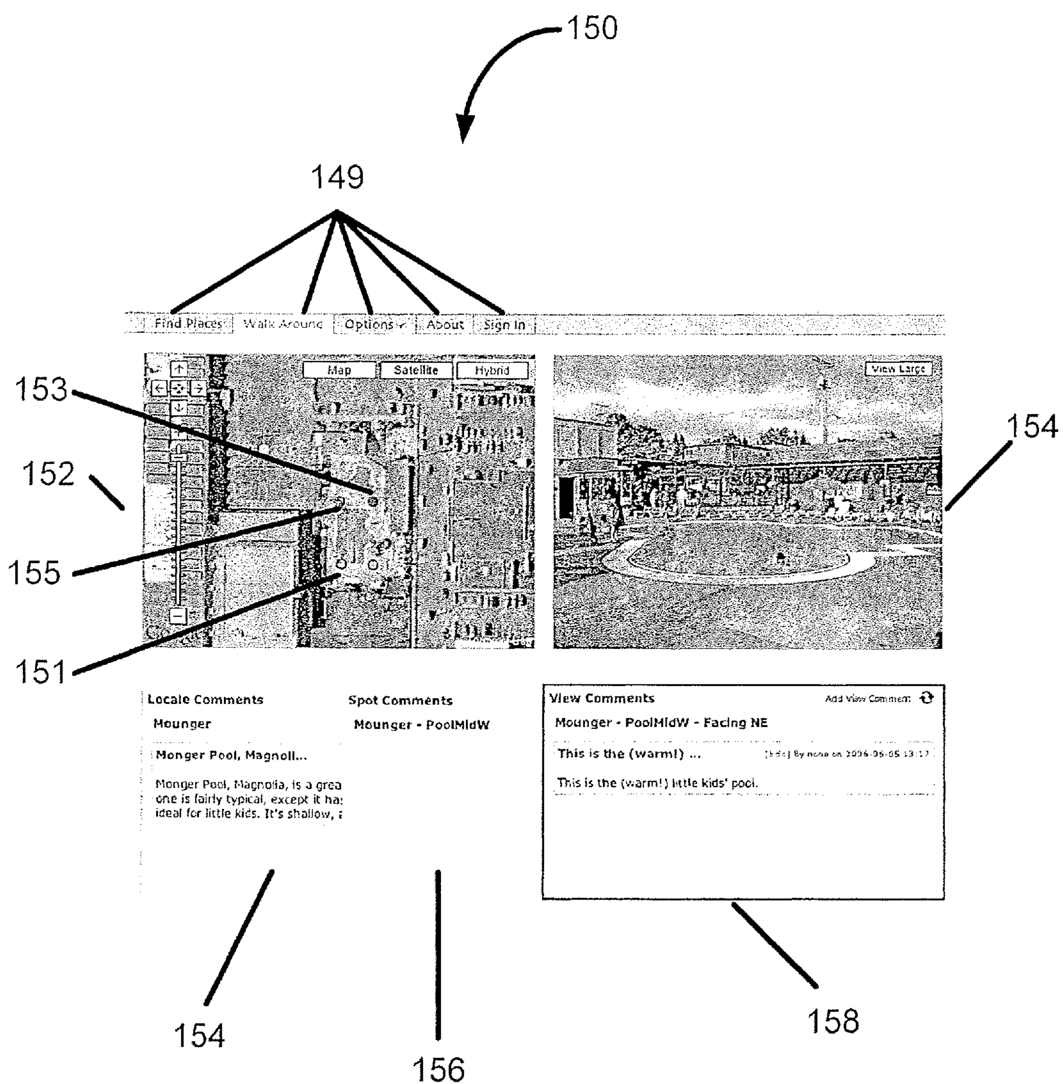
FIG. 4 shows a "Walk Around" GUI in an embodiment.

A "Walk Around" GUI 150 is shown in FIG. 4. The GUI 150 includes an overhead map view 152. Users can jump directly to a spot or feature of interest by clicking on any marker 140 in the overhead map view 152. When a user turns, or moves to another spot, the map 152 updates to the new location and orientation. The map 152 also shows other spots that are in the vicinity, and the user can see at a glance which spots have already been "visited" by the type of marker 410 on each spot; in embodiments, empty circles 151 signify unvisited spots and filled circles 153 signify visited spots. A current spot marker 155 is a filled circle with an arrow pointing in the current direction, and a destination marker (not shown) with a '+' symbol can indicate the spot the user moves to if the user performs the "move-forward" action.

The overhead map 152 can be a top-down view, including but not limited to a map, satellite imagery, "bird's-eye view" imagery, an architectural floor plan, a hand-sketched diagram and a user-supplied image. A top-down view provides an overview of the area of interest in enough detail to distinguish the positions of a locale's spots. If a custom top-down image is used, then the locale creator first geo-locates the top-down image. In some cases, a distant panoramic side view can be used in place of a top-down image if the area of interest is very linear, for example, a section of seashore.

Alongside the overhead map 152 is a view window 154 for displaying digital images, which can include real, eye-level, photographic images. Some views have "zooms", which can be close-up images of specific areas within a view, or information or images related to the view. Clicking on a zoom icon can animate the zoom image so it appears to grow from the position on the screen of its marking identifier into a larger image. The server can provide images to match the real time of day, date, or season of the spot if images taken at different times are associated with the spot.

Locale, spot, view and feature (not shown) comment areas 154, 156, 158 can display comments made by users about the displayed locale, spot, and view, respectively. Feature comments are related to a feature in the locale which may appear in more than one specific view or spot, i.e. a distant mountain peak that is visible from all easterly views in a locale. Users can also make requests to be displayed in the areas 154, 156, 158, such as a request that digital images be captured at a specific spot.

Movement, turning and zooming are performed from a first-person perspective; these actions can be performed either by using the keyboard, or by using the mouse or other user interaction. Other interactions include but are not limited to touch-screens, voice commands, and/or motion controls. Users can rotate from a current direction to an adjacent direction. Users can navigate forward, backward, up, down, or sideways, and can navigate directly to other spots in the locale, and the view displayed will change accordingly.

Embodiments of the invention allow users to smoothly transition from one view to the next. When the user rotates the current direction, the old view slides out, and as the old view slides out, the new view slides in to take its place (left, right, up or down). Embodiments allow locale creators to specify the amount of overlap between any two adjacent views, which allows the new view panning in to start out partially overlapped by the old view, if desired. In the case of moving forward and backward, the new view can zoom in or out as the old view zooms out or in, and during this process the views can fade out and in. Animated line graphics representing the new view can "float" above the old view and expand or contract to symbolize the movement to the new view.

Figure 5:
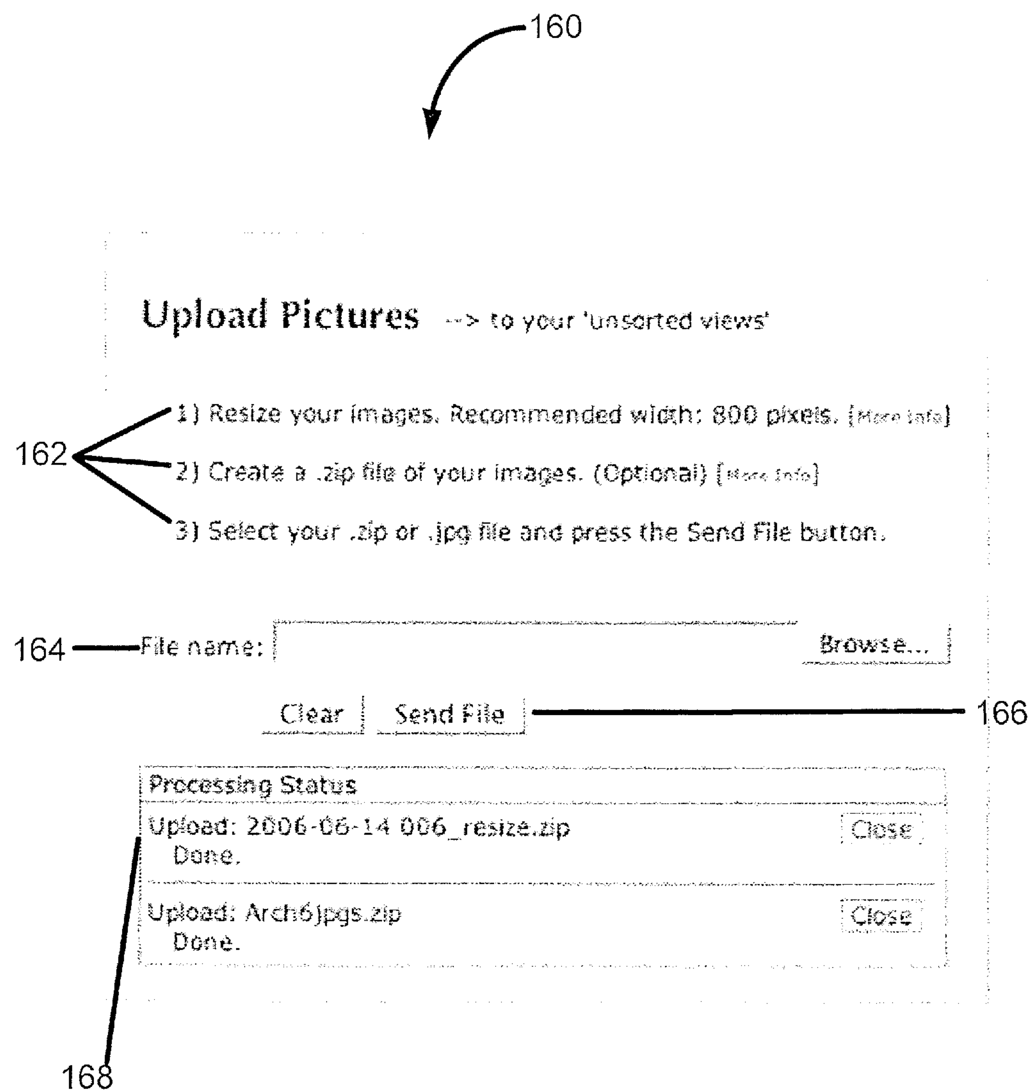
FIG. 5 shows an "Upload" GUI in an embodiment.

An "Upload" GUI 160 shown in FIG. 5 enables users to upload digital images. The interface 160 includes directions 162 and a "File Upload" field 164. The user selects either an individual .jpeg or other photo file type, or .zip file containing multiple images, and presses a 'Send File' button 166. While the file is being uploaded, the upload progress is displayed to the user. Once the file is uploaded, embodiments can process the raw uploaded image files and create multiple resolutions of said images for storage on the server to be used for various purposes. As each image or batch of images is being processed, the status of the processing for that batch can be displayed onscreen for the user to view. Embodiments can allow the user to leave the interface 160 during image processing, and can allow the user to start using processed images before all images have been processed. Downloadable applications or plug-ins can be included, but are not required for uploading images.

Figure 6A:
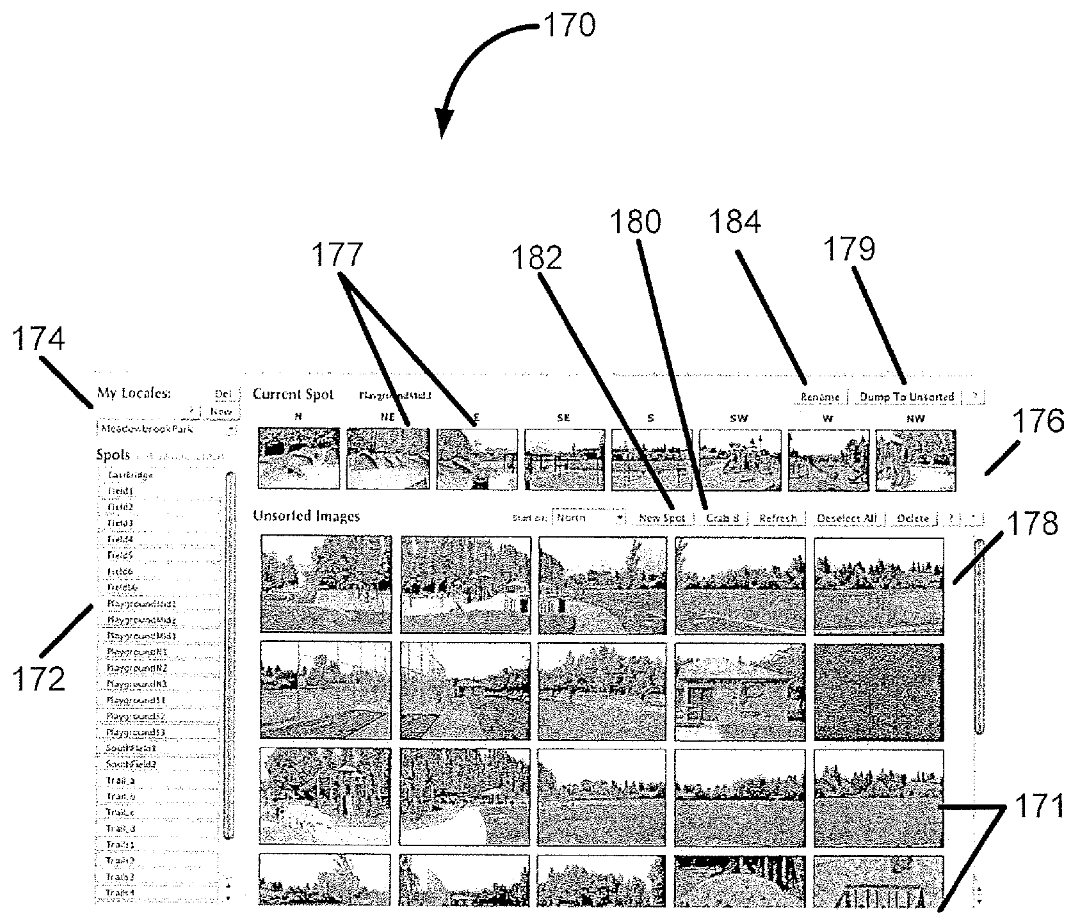
FIG. 6A shows a sort GUI in an embodiment.

A "Sort" GUI 170, shown in FIG. 6A, allows users to sort images 171 by spot and orientation. A spot list 172 lists all the spots associated with the current locale, displayed in a "My Locales" area 174. The user can click on any spot name to select a spot and display the spot's images in a "Current Spot" or "Selected Spot" display area 176; the area 176 displays views 177 associated with the current spot.

Uploaded images which have not been assigned to a spot appear in the user's "Unsorted Images" bin 178. In an embodiment, thumbnails are arranged in a grid, from which the user can sort the images 171 into spots corresponding to, for example, the physical location(s) from which they were taken. If the images 171 are in left-to-right order, then the user can select the first image, click on a "Grab 8" button 180, and select seven more images in order. Alternatively, if the images 171 are not in left-to-right order, the user can select each image in order to get a left-to-right ordering. The user can add other images associated with a spot, like zooms or up/down shots.

When all images are selected for a desired spot, the user clicks a "New Spot" button 82 and is prompted for a spot name. When the user enters a name, a new spot is created, and is added to the spot list 172 for the current locale. Spots can be renamed by clicking a "Rename" button 184 and typing a new name. Geo-located spots can be "dumped" back into the Unsorted Images bin 178 by clicking a "Dump to Unsorted" button 179. When a spot is dumped, its images are kept together as a group, within the Unsorted Images bin, but other references to it are deleted, such as its location on the map 1106.

Figure 6B:
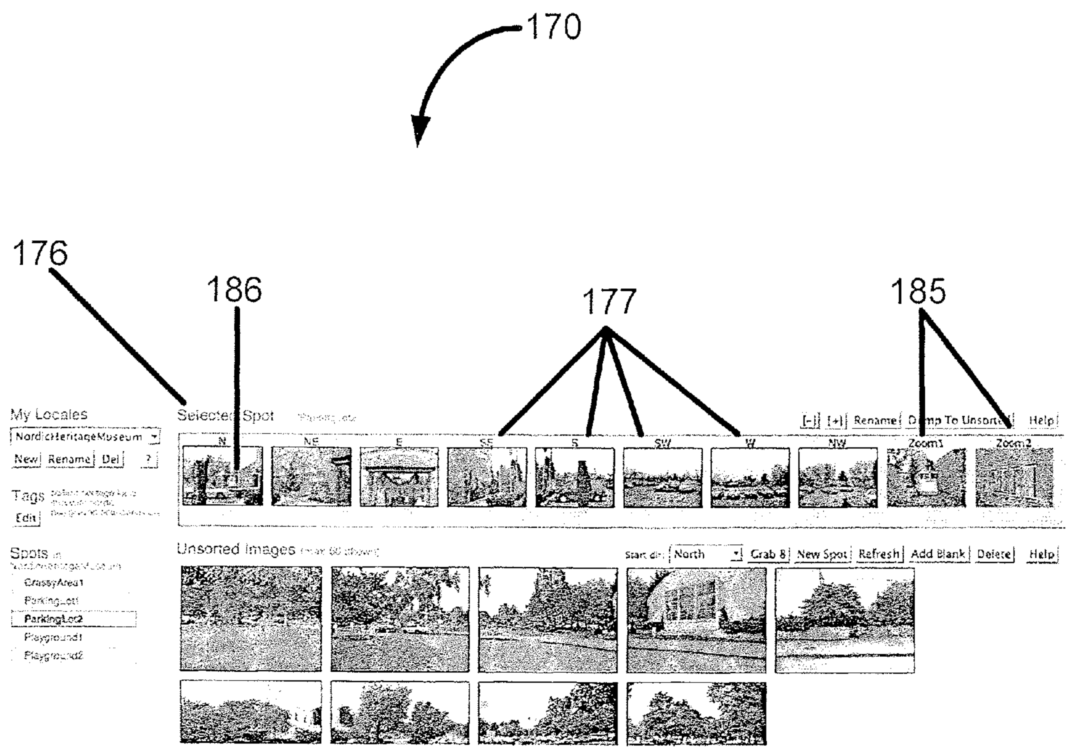
FIG. 6B shows an alternate embodiment of a Sort GUI.

FIG. 6B shows an alternate embodiment of a Sort GUI 170. The Selected Spot area 176 includes eight views 177 associated with the eight major compass directions, and two zooms 185 associated with a view 177 of the spot. Users can associate zooms 185 with views 177 with either the Sort GUI 170 or the Locate/Link GUI 190 (shown below).

To associate a zoom 185 with a particular point of interest on a view 177, the user clicks and drags the zoom 185 onto the desired view 177, and a zoom icon 186 is created on the view 177 at that point. After the zoom 185 has been associated with its view 177, the user can reposition the zoom 185 by clicking and dragging a zoom icon 186 representing the zoom 185 within the view 177. The interface 170 lightly constrains the icon 186 within the edges of the associated view 177, to allow easy positioning at the edges, but also allows deletion of the association via a quick dragging motion to escape the edges of the view 177. When the zoom icon 186 has been dragged outside its associated view 177, its graphical representation 186 changes to highlight the fact that if the user releases the icon 186, the association will be deleted.

Zooms 85 can be associated with any view 177, multiple different zooms 185 can be associated with a single view 177, and one zoom 185 can be associated with different views 177; for example, when an item of interest lies in an area which visually overlaps two adjacent views 177. Zooms 185 can be merely magnified views of an area of interest, or angles can be completely different to get a better view of an item of interest. The zoom 185 could "peer over, or around" a fence or other obstacle, "peek" inside a window, or through a wall of a building, if a user has access to an image of the inside of the building. A view 177 of the outside of a restaurant could associate a position on the restaurant's front door with a zoom 185 of the restaurant's menu. The zoom 185 could be an image of different times, days or seasons.

Figure 7:
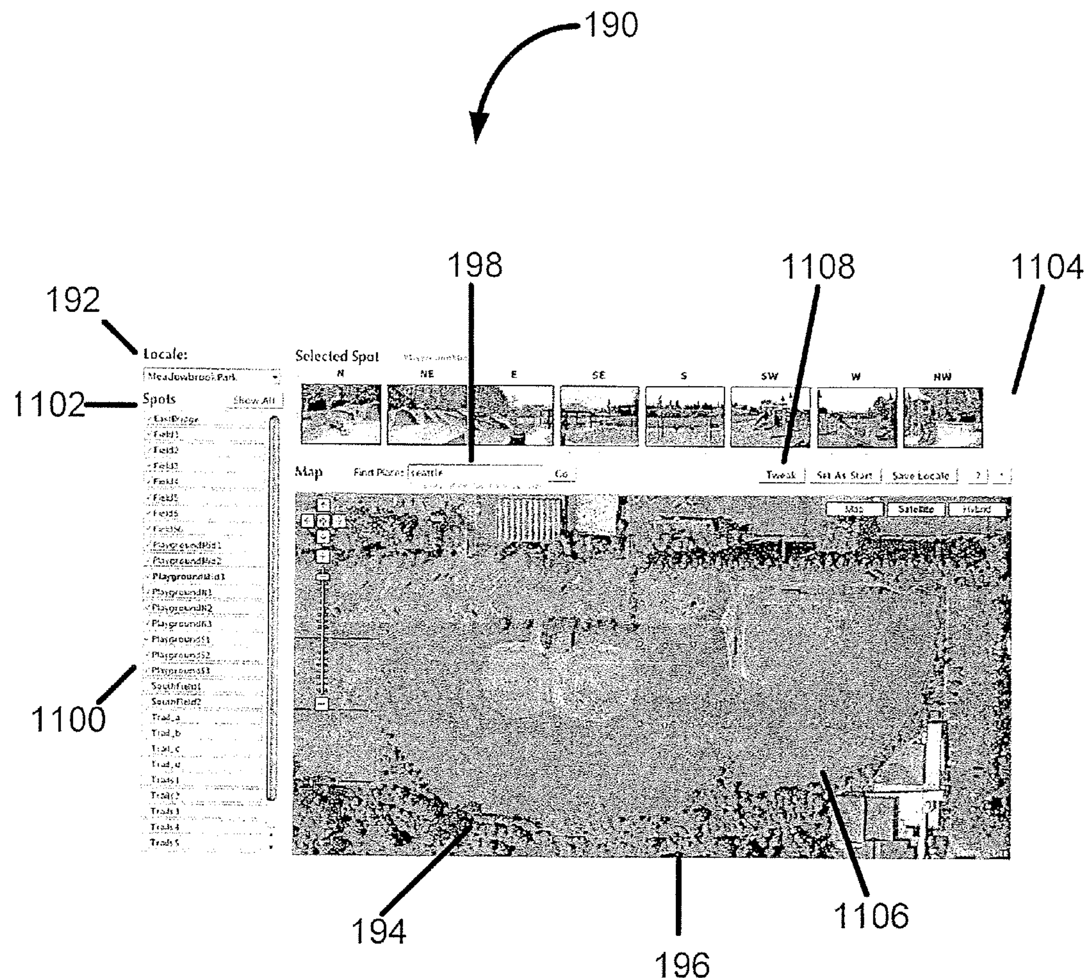
FIG. 7 shows a Locate/Link GUI in an embodiment.

A Locate/Link GUI 190, shown in FIG. 7, allows users to specify a geographical location for each spot and create links between spots.

For existing locales, the user selects a locale from the Locale list 192, and a map 94 including the locale data is displayed in a map pane 196. If the user is locating a new locale the user can move the map 194 to a new location by typing the location name or other identifying information into a "Find Place" field 198 above the map pane 196, or the user can position the map 194 by panning and/or zooming in until they find the correct place.

A "Spots" area 1100 lists all spots associated with the current locale. Spots that have already been geo-located will have an indicator, such as a checkbox 1102.

To geo-locate a spot, a user displays a desired location of the spot in the map pane 196 and selects a spot to geo-locate by clicking on the spot name in the Spots area 1100—a selected spot's views will be displayed in the Selected Spot area 1104, above the map pane 196. The user then clicks on the map 194 at the desired location of the spot and an indicator 1106 appears at the desired location on the map 194. Once placed, a spot's exact location can be adjusted in fine or coarse detail by using the keyboard and/or mouse. Other embodiments can correlate spots with a set of previously defined geographic coordinates, for example from a GPS device.

To move a spot that has already been located, users can select the spot and use the arrow keys to move the spot marker 1106 on the map 194, or hold down the "M" key (move) on the keyboard and click on the desired location on the map 194, or input actual coordinate data.

Spots that have been geo-located can be linked together so users can navigate around the locale among the spots. One embodiment allows users to link two spots by selecting a first spot by clicking on its marker 1106 or its name in the Spots area 1100, and holding down the "C" key (connect) and clicking on a marker 1106 for a second spot. A line (not shown) appears between the spots, signifying that the spots are linked. Spots can be linked with more than one other spot.

A link between spots is actually comprised of two separate "moves", one in each direction; i.e. a move from the first spot to the second spot, and a move from the second spot to the first spot.

Embodiments can allow users to delete moves and/or links, for example, by clicking on a link marker connecting 2 spots and allowing the user to choose which moves to delete.

Embodiments can download various meta-data about a locale, its spots, views, tags and structure to the client, giving the ability to change various aspects of the client GUI (like sorting criteria and/or appearance of markers on the map) without querying the server. For example, the default legend might color the locale markers according to how many spots they contain, but users can change the marker colors or appearance to distinguish the visible locales by area type, i.e. Residential, Business, Park, Rural, Beach; or by user rating, or by date of creation, or any number of other criteria.

In a network-based client-server application, there are actions that directly modify data on the servers, and/or there are actions that can be local to the user's computer until the changes are explicitly saved to the servers. There is an overhead to maintaining or synchronizing the data between client and server. When changes that are local to the user's computer occur, embodiments can keep track of the number of changes made and/or the types of changes made, and can use that information to gradually alter the appearance of one or more aspects of the GUI on-screen as the user makes local changes, thereby giving more useful information to the user than a simple binary "dirty" indicator. So, for example, as the user is manipulating newly uploaded images, the modification indicator can change slightly each time the user modifies data; i.e. the color of the border of the graphical representation of the data changes from neutral to light red and eventually to deep red. Or, as shown in FIGS. 8A-8E, a button such as a "Save Locale" button 1110 can change color from white to dark red.

This aspect of the invention can be applied to general-purpose software applications, including desktop applications or any other software which manipulates data and for which those manipulations and/or the manipulated data can be saved. Various software applications and GUIs have a visual mechanism to indicate that a document is "dirty" (has unsaved changes), but a binary representation is not nearly as useful as being able to see at a glance HOW dirty the document is at the moment. The rate of change of the appearance of the graphical representation of the dirtiness with respect to the changes in the unsaved data can be set by a user. Thus, for a text document, a user could set a visual change to occur after adding, modifying, or deleting every ten characters, or after every hundred characters, or after every 1,000 characters. Varied algorithms can be used to determine when and/or how often to update the indicator(s). Embodiments can use different color schemes to make more obvious the amount of editing that has taken place since the last save. For example, faint green to bright green to faint yellow to bright yellow to faint orange to bright orange to faint red to bright red.

Other visual indicators can optionally be offered to make it even more obvious to the user how much editing has taken place since the last save. Instead of, or in addition to gradually changing colors, a strategically located icon or other graphical representation could change through a set of different appearances, each of a more urgent nature than the last.

Figure 9:
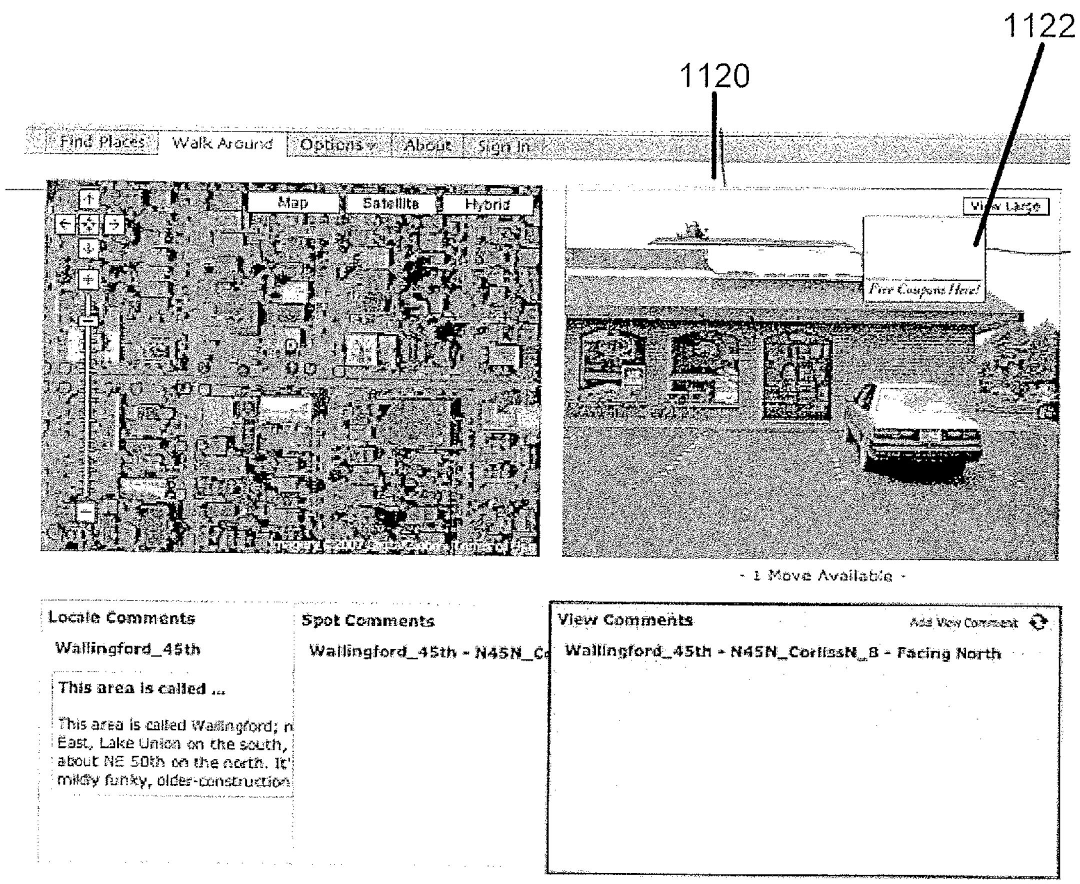
FIG. 9 shows an example of a restaurant in one embodiment.

Embodiments can include ads embedded within images. For example, an image of a billboard can have virtual ads placed directly in the billboard area, complete with PPC (pay per click) outbound linking. As shown in FIG. 9, a view 1120 of a restaurant can have a clickable embedded ad 1122 featuring the name of the restaurant and an offer of free coupons. Also, images of or near businesses or related places of interest can contain ads of many different kinds, including rollover hotspots with data, imagery or PPC outbound links. Embedded ads can be in the form of zooms, where clicking on a zoom icon displays the ad. The ad links could be a portion of a captured image provided by a user, or ads can be overlaid after the fact.

Clients who wish to keep ads (which may be a competitor's) off a particular locale can pay to either run ads of their choosing, or to run no ads whatsoever on locale(s) and/or view(s) of their choosing.

Server-side software can "paste" small images/links/icons directly onto the views themselves dynamically at delivery time. For example, in the upper right corner of all images, or of all images belonging to a particular user, or for all images being viewed by a particular user, or for all users from Alabama, or all locales in Alabama, etc. By adding these ad images dynamically, embodiments can optionally reposition them to different parts of the views. Users of the invention have a trust level. New users generally have a trust level of zero. As they contribute good, valid data, their trust level goes up. All locale and/or image data has a trust level equal to the trust level of the user that supplied the data. As more trusted users view the data without flagging it as bad, corrupt or otherwise inappropriate, the trust level of the data increases. Users can specify that only data of a certain trust level or higher be displayed. Embodiments can allow businesses or other entities or groups to have restricted access to their locale data and/or images so that only authorized representatives may view, annotate, comment on and/or manipulate the data for one or more locales.

Some entities may be willing to pay to have high quality locales created for their locations. Aspects of the invention can include allowing, in a controlled way, locale creators and locations to advertise their availabilities and needs, for example, in view, spot, or locale comment areas, or within views in their own locales.

Entities can also pay or bid for services using points rewarded to the entity through a point system. Users are rewarded points for various activities, such as flagging inappropriate content or capturing one or more digital images of a particular location. As users accumulate points, the users can offer the points to other users as incentives to perform some activity, such as capturing a digital image of a particular location or creating a locale. Points can also be used to bid for a section of pixels on our pages, which are displayed to the general public. Users of the site can promote a favorite charity, a blog, a business, or anything to which a user wants to draw attention.

In an alternate embodiment, feature comments are included. Feature comments are comments related to a particular feature in a locale which can be visible in many different views. Without this, it can sometimes be difficult to find all the comments related to a particular item of interest within a locale. Essentially, it's a sub-grouping of comments that can be associated separately from a particular spot or view.

In yet another embodiment the view can also be partially rotated, before or while moving forward/backward. This allows the new view to be aligned closer to the center of the currently displayed view, which helps the user maintain their visual frame of reference as they move to another spot—especially with any zooming animation.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A computer-readable medium having instructions that, when executed by a processing device, enable the processing device to perform a method comprising the steps of:

receiving multiple digital images, and user-generated and user-selectable data, from at least one user;

associating the multiple digital images and user-generated data from a database to produce a navigable locale from a first-person perspective in relation to at least one location of a map presentable on a display device;

organizing the digital images according to the data, including associating the images to a view within the navigable locale with the at least one location and at least one direction;

generating to the display device, a set of the digital images sorted in a succession and orientation corresponding and in response to a set of user selections of the at least one direction at the at least one location, the view from the first-person perspective;

wherein said set of the digital images sorted in a succession and orientation further comprises a tour highlighting spots or views of interest through the navigable locale, including locales of other users; and wherein said tour further comprises a guided tour that users can create for others to follow through an ordered set of moves, turns and zooms to see whatever the user who created the tour wants to highlight.

2. A system comprising:

a computer-readable memory including multiple user-generated digital images and user-generated and user-selectable data;

a display device;

a processor in data communication with the memory, the display device, and a network; the processor comprising:

a first component configured to receive multiple digital images, and user-generated data, from at least one user;

a second component configured to organize the digital images from a database into a navigable locale from at least one location of a map viewable on the display device according to the user-generated and user-selectable data, including associating the images with the at least one location and at least one direction to a view within the navigable locale;

a third component configured to generate to the display device the view from a first-person perspective within the navigable locale from the at least one location, and a set of the digital images sorted in a succession and orientation corresponding to and in response to a set of user selections of the at least one direction;

wherein said set of the digital images sorted in a succession and orientation further comprises a tour highlighting spots or images of interest through the navigable locale, including locales of other users; and wherein said tour further comprises a guided tour that users can create for others to follow through an ordered set of moves, turns and zooms to see whatever the user who created the tour wants to highlight.

* * * * *